(12) United States Patent
Qu et al.

(10) Patent No.: US 10,057,089 B2
(45) Date of Patent: Aug. 21, 2018

(54) DATA PROCESSING METHOD AND APPARATUS

(71) Applicant: Huawei Technologies Co., Ltd., Shenzhen (CN)

(72) Inventors: Daiming Qu, Wuhan (CN); Fang Wang, Wuhan (CN); Tao Jiang, Wuhan (CN); Lei Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/663,177

(22) Filed: Jul. 28, 2017

(65) Prior Publication Data

US 2017/0331649 A1    Nov. 16, 2017

Related U.S. Application Data

(63) Continuation of application No. PCT/CN2015/072031, filed on Jan. 30, 2015.

(51) Int. Cl.
*H04B 1/10* (2006.01)
*H04L 25/03* (2006.01)

(52) U.S. Cl.
CPC .............. *H04L 25/03159* (2013.01)

(58) Field of Classification Search
CPC .... H04L 25/03159; H04L 5/06; G06F 17/142
USPC ................. 375/350, 229, 232, 260
See application file for complete search history.

(56) References Cited

U.S. PATENT DOCUMENTS

| | | | |
|---|---|---|---|
| 2001/0030940 A1* | 10/2001 | Hellberg | H04L 5/06 370/210 |
| 2002/0061075 A1 | 5/2002 | Dartois | |
| 2012/0093176 A1 | 4/2012 | Siohan et al. | |
| 2016/0357705 A1* | 12/2016 | Shibayama | G06F 17/142 |

FOREIGN PATENT DOCUMENTS

| | | |
|---|---|---|
| CN | 1312987 A | 9/2001 |
| CN | 102461106 A | 5/2012 |

* cited by examiner

*Primary Examiner* — Phuong Phu
(74) *Attorney, Agent, or Firm* — Leydig, Voit & Mayer, Ltd.

(57) ABSTRACT

Embodiments of the present invention provide a data processing method and apparatus. The method includes: selecting at least two groups of data from a to-be-processed data stream according to a preset first interval in a staggered manner; performing Fourier transform on each of the at least two groups of data to obtain at least two groups of first data; performing frequency domain filtering on the at least two groups of first data by using a prototype filter, to obtain at least two groups of second data; performing inverse Fourier transform on each of the at least two groups of second data to obtain at least two groups of third data; and adding the at least two groups of third data according to a preset second interval in a staggered manner. In the process, data obtained after transform reserves a feature of a single carrier, and has a low peak-to-average ratio.

16 Claims, 5 Drawing Sheets

DATA PROCESSING METHOD AND APPARATUS

CROSS-REFERENCE TO RELATED APPLICATIONS

This application is a continuation of International Application No. PCT/CN2015/072031, filed on Jan. 30, 2015, the disclosure of which is hereby incorporated by reference in its entirety.

TECHNICAL FIELD

The embodiments of the present invention relate to the field of wireless communications technologies, and more specifically, to a data processing method and apparatus.

BACKGROUND

A filter bank multicarrier (FBMC) technology is a multicarrier modem technology. Compared with an orthogonal frequency division multiplexing (OFDM) technology, the FBMC has lower out-of-band radiation and higher spectral efficiency, and has a good application prospect. A typical implementation solution of the FBMC is using the orthogonal frequency division multiplexing/offset quadrature amplitude modulation (OQAM) technology. In an OFDM system, a quadrature amplitude modulation (QAM) symbol of a complex number is sent, and in OFDM/OQAM, an OQAM symbol of a pure real number or a pure imaginary number is sent. Quadrature of transmit signals in a frequency domain and a time domain is implemented by using a quadrature characteristic of a prototype filter in a real number domain.

In an FBMC system, a transmit end and a receive end respectively implement FBMC modulation and demodulation of frequency domain data and received time domain data of a user by using respective poly-phase network (PPN) filter banks. The poly-phase network filter bank of the transmit end is referred to as a synthesis filter bank (SFB). The poly-phase network filter bank of the receive end is referred to as an analysis filter bank (AFB).

However, as a multicarrier technical solution, the FBMC has a relatively high peak-to-average ratio (PAPR). A high PAPR may cause occurrence of signal distortion and an out-of-band leakage increase after a signal passes through a non-linear radio frequency component, and may also cause an energy efficiency decrease of a power amplifier.

A low-PAPR single carrier signal processing method in the conventional art is: performing AFB filtering on a single carrier signal at a transmit end, and performing SFB filtering after subcarrier mapping and a necessary signal processing process. Because the AFB and the SFB have reciprocity, a signal obtained after the foregoing transform reserves some features of the single carrier signal, and has a relatively low PAPR. The receive end restores a signal by using an inverse process of the transmit end. However, processing methods of AFB filtering and SFB filtering in the processing method has relatively high complexity.

SUMMARY

Embodiments of the present invention provide a data processing method and apparatus, to ensure a relatively low PAPR and relatively low complexity.

According to a first aspect, a data processing method is provided, including: selecting at least two groups of data from a to-be-processed data stream according to a preset first interval in a staggered manner; performing Fourier transform on each of the at least two groups of data to obtain at least two groups of first data; performing frequency domain filtering on the at least two groups of first data by using a prototype filter, to obtain at least two groups of second data; performing inverse Fourier transform on each of the at least two groups of second data to obtain at least two groups of third data; and adding the at least two groups of third data according to a preset second interval in a staggered manner.

With reference to the first aspect, in a first possible implementation of the first aspect, the prototype filter includes a first prototype filter and a second prototype filter, and the performing frequency domain filtering on the at least two groups of first data by using a prototype filter, to obtain at least two groups of second data includes: obtaining numbers of subcarriers that need to be mapped; and performing frequency domain filtering on the at least two groups of first data according to the first prototype filter, the second prototype filter, and the numbers of the subcarriers, to obtain the at least two groups of second data.

With reference to the first aspect, in a second possible implementation of the first aspect, the prototype filter includes a first prototype filter and a second prototype filter, and the performing frequency domain filtering on the at least two groups of first data by using a prototype filter, to obtain at least two groups of second data includes: performing frequency domain prefiltering on the at least two groups of first data according to a frequency domain response of the first prototype filter, to obtain at least two groups of prefiltered data; performing subcarrier mapping on the at least two groups of prefiltered data to obtain at least two groups of mapped data; and performing frequency domain post-filtering on the at least two groups of mapped data according to a frequency domain response of the second prototype filter, to obtain the at least two groups of second data.

With reference to the second possible implementation of the first aspect, in a third possible implementation of the first aspect, the performing frequency domain prefiltering on the at least two groups of first data according to a frequency domain response of the first prototype filter, to obtain at least two groups of prefiltered data includes: performing conjugation on a first frequency domain response of the first prototype filter to obtain a first vector, or using a first frequency domain response of the first prototype filter as a first vector; performing circular left shifting on the first vector for at least once to obtain a second vector; and performing vector multiplication on the at least two groups of first data and the second vector to obtain the at least two groups of prefiltered data.

With reference to the second or the third possible implementation of the first aspect, in a fourth possible implementation of the first aspect, the performing frequency domain post-filtering on the at least two groups of mapped data according to a frequency domain response of the second prototype filter, to obtain the at least two groups of second data includes: performing circular left shifting on a second frequency domain response of the second prototype filter for at least once to obtain a third vector, and performing vector multiplication on the at least two groups of mapped data and the third vector to obtain the at least two groups of second data.

With reference to any one of the second to the fourth possible implementations of the first aspect, in a fifth possible implementation of the first aspect, two adjacent subcarriers to which the at least two groups of prefiltered data are mapped are spaced by $K_2-1$ empty subcarriers, where $K_2$ is an overlapping factor of the second prototype filter.

With reference to any one of the second to the fifth possible implementations of the first aspect, in a sixth possible implementation of the first aspect, the preset first interval is N/2, the preset second interval is M/2, a quantity of each of the at least two groups of data is $K_1 \times N$, and a quantity of each of the at least two groups of second data is $K_2 \times M$, where $K_1$ is an overlapping factor of the first prototype filter, $K_2$ is the overlapping factor of the second prototype filter, N is a quantity of effective frequency domain subchannels, M is a total quantity of frequency domain subchannels, M>0, and N>0.

With reference to the first aspect, in a seventh possible implementation of the first aspect, the prototype filter includes a first prototype filter and a second prototype filter, and the performing frequency domain filtering on the at least two groups of first data by using a prototype filter, to obtain at least two groups of second data includes: performing frequency domain prefiltering on the at least two groups of first data according to the second prototype filter, to obtain at least two groups of prefiltered data; performing an equalization operation on the at least two groups of prefiltered data to obtain at least two groups of equalized data; oversampling the at least two groups of equalized data to obtain the at least two groups of oversampled data; and performing post-filtering on the at least two groups of oversampled data according to the first prototype filter, to obtain the at least two groups of second data.

With reference to the seventh possible implementation of the first aspect, in an eighth possible implementation of the first aspect, the oversampling the at least two groups of equalized data to obtain the at least two groups of oversampled data includes: inserting $K_1-1$ pieces of empty data between two pieces of adjacent data in any one of the at least two groups of equalized data, to obtain the at least two groups of oversampled data, where $K_1$ is an overlapping factor of the first prototype filter.

With reference to the seventh or the eighth possible implementation of the first aspect, in a ninth possible implementation of the first aspect, the preset first interval is M/2, the preset second interval is N/2, a quantity of each of the at least two groups of data is $K_2 \times M$, and a quantity of each of the at least two groups of second data is $K_1 \times N$, where $K_1$ is the overlapping factor of the first prototype filter, $K_2$ is an overlapping factor of the second prototype filter, N is a quantity of effective frequency domain subchannels, M is a total quantity of frequency domain subchannels, M>0, and N>0.

According to a second aspect, a data processing apparatus is provided, including: a selection unit, configured to select at least two groups of data from a to-be-processed data stream according to a preset first interval in a staggered manner; a transformation unit, configured to perform Fourier transform on each of the at least two groups of data to obtain at least two groups of first data; a filtering unit, configured to perform frequency domain filtering on the at least two groups of first data by using a prototype filter, to obtain at least two groups of second data; an inverse transformation unit, configured to perform inverse Fourier transform on each of the at least two groups of second data to obtain at least two groups of third data; and an addition unit, configured to add the at least two groups of third data according to a preset second interval in a staggered manner.

With reference to the second aspect, in a first possible implementation of the second aspect, the prototype filter includes a first prototype filter and a second prototype filter, and the filtering unit is specifically configured to: obtain numbers of subcarriers that need to be mapped; and perform frequency domain filtering on the at least two groups of first data according to the first prototype filter, the second prototype filter, and the numbers of the subcarriers, to obtain the at least two groups of second data.

With reference to the second aspect, in a second possible implementation of the second aspect, the prototype filter includes a first prototype filter and a second prototype filter, and the filtering unit is specifically configured to: perform frequency domain prefiltering on the at least two groups of first data according to a frequency domain response of the first prototype filter, to obtain at least two groups of prefiltered data; perform subcarrier mapping on the at least two groups of prefiltered data to obtain at least two groups of mapped data; and perform frequency domain post-filtering on the at least two groups of mapped data according to a frequency domain response of the second prototype filter, to obtain the at least two groups of second data.

With reference to the second possible implementation of the second aspect, in a third possible implementation of the second aspect, the filtering unit is specifically configured to: perform conjugation on a first frequency domain response of the first prototype filter to obtain a first vector, or use a first frequency domain response of the first prototype filter as a first vector; perform circular left shifting on the first vector for at least once to obtain a second vector; and perform vector multiplication on the at least two groups of first data and the second vector to obtain the at least two groups of prefiltered data.

With reference to the second or the third possible implementation of the second aspect, in a fourth possible implementation of the second aspect, the filtering unit is specifically configured to: perform circular left shifting on a second frequency domain response of the second prototype filter for at least once to obtain a third vector, and perform vector multiplication on the at least two groups of mapped data and the third vector to obtain the at least two groups of second data.

With reference to any one of the second to the fourth possible implementations of the second aspect, in a fifth possible implementation of the second aspect, two adjacent subcarriers to which the at least two groups of prefiltered data are mapped are spaced by $K_2-1$ empty subcarriers, where $K_2$ is an overlapping factor of the second prototype filter.

With reference to any one of the second to the fifth possible implementations of the second aspect, in a sixth possible implementation of the second aspect, the preset first interval is N/2, the preset second interval is M/2, a quantity of each of the at least two groups of data is $K_1 \times N$, and a quantity of each of the at least two groups of second data is $K_2 \times M$, where $K_1$ is an overlapping factor of the first prototype filter, $K_2$ is the overlapping factor of the second prototype filter, N is a quantity of effective frequency domain subchannels, M is a total quantity of frequency domain subchannels, M>0, and N>0.

With reference to the second aspect, in a seventh possible implementation of the second aspect, the prototype filter includes a first prototype filter and a second prototype filter, and the filtering unit is specifically configured to: perform frequency domain prefiltering on the at least two groups of first data according to the second prototype filter, to obtain at least two groups of prefiltered data; perform an equalization operation on the at least two groups of prefiltered data to obtain at least two groups of equalized data; oversample the at least two groups of equalized data to obtain the at least two groups of oversampled data; and perform post-filtering on the at least two groups of oversampled data according to the first prototype filter, to obtain the at least two groups of second data.

With reference to the seventh possible implementation of the second aspect, in an eighth possible implementation of the second aspect, the filtering unit is specifically configured to: insert $K_1-1$ pieces of empty data between two pieces of adjacent data in any one of the at least two groups of equalized data, to obtain the at least two groups of oversampled data, where $K_1$ is an overlapping factor of the first prototype filter.

With reference to the seventh or the eighth possible implementation of the second aspect, in a ninth possible implementation of the second aspect, the preset first interval is M/2, the preset second interval is N/2, a quantity of each of the at least two groups of data is $K_2 \times M$, and a quantity of each of the at least two groups of second data is $K_1 \times N$, where $K_1$ is the overlapping factor of the first prototype filter, $K_2$ is an overlapping factor of the second prototype filter, N is a quantity of effective frequency domain subchannels, M is a total quantity of frequency domain subchannels, M>0, and N>0.

In the embodiments of the present invention, multiple groups of data are selected from a data stream in a staggered manner. Signal processing is performed on the multiple groups of data in a frequency domain by using a prototype filter, and complexity of the processing process is relatively low. In the process of performing signal processing on the multiple groups of data, an invertible feature of discrete Fourier transform and inverse discrete Fourier transform is used, so that data obtained after transform reserves a feature of a single carrier, and has a relatively low peak-to-average ratio.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various wireless communications systems, for example, a system based on Wireless Fidelity (WiFi), Bluetooth (Bluetooth), Worldwide Interoperability for Microwave Access (WiMAX), a wireless local area network authentication and privacy infrastructure (WAPI), and the like, and another communications system connecting terminals to each other in a wireless manner.

Figure 1:
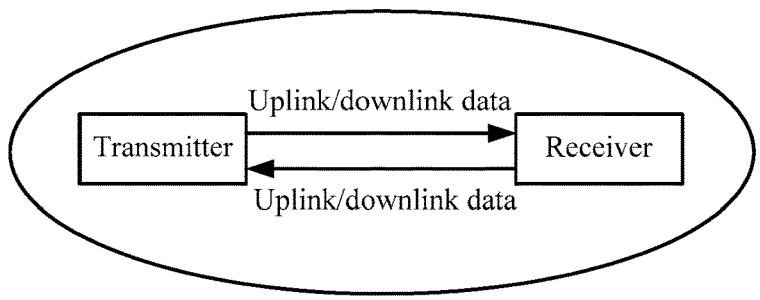
FIG. 1 is a schematic diagram of an applicable scenario of the present invention.

FIG. 1 is a schematic diagram of an applicable scenario of the present invention. The scenario of FIG. 1 includes a transmitter and a receiver.

It should be understood that in uplink data transmission, a transmitter in a base station may send downlink data to a terminal device, and a receiver of the terminal device receives the downlink data. In downlink data transmission, a transmitter in the terminal device may transmit uplink data to the base station, and a receiver of the base station receives the uplink data.

Figure 2:
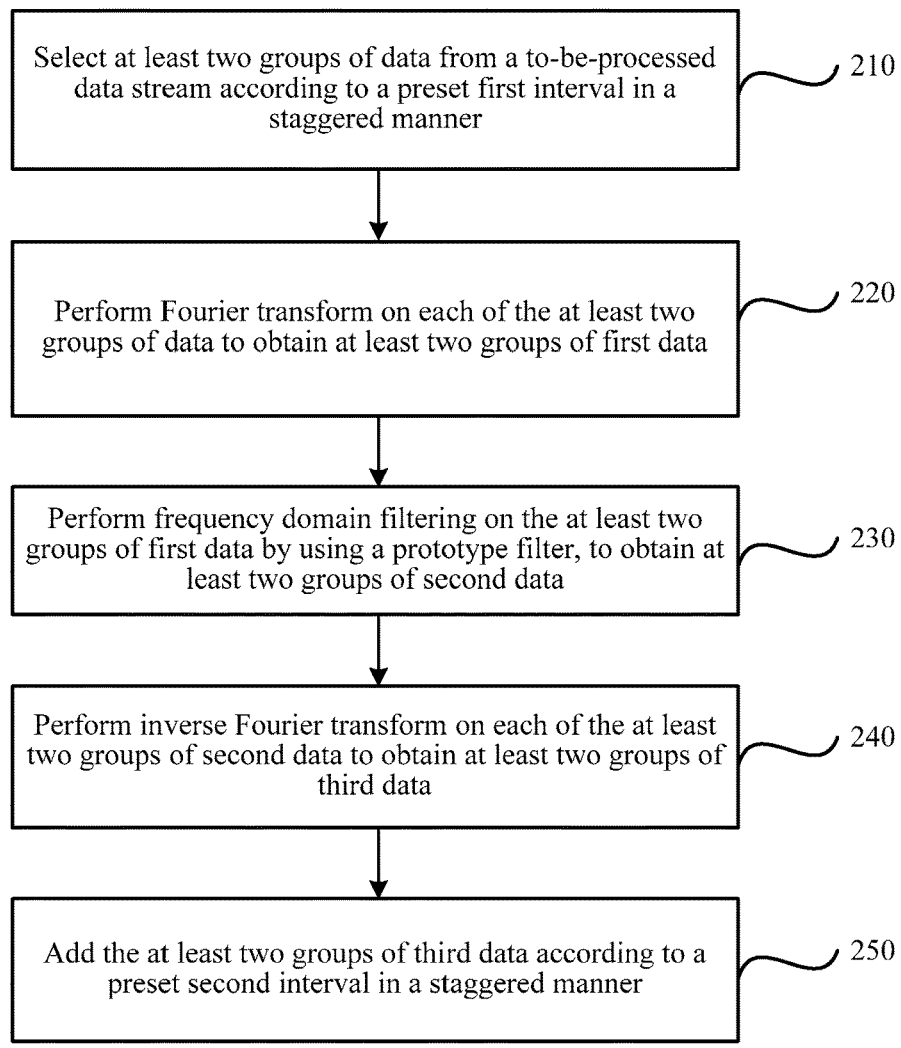
FIG. 2 is a schematic flowchart of a data processing method according to an embodiment of the present invention.

FIG. 2 is a schematic flowchart of a data processing method according to an embodiment of the present invention. A data processing method 200 shown in FIG. 2 may be executed by a transmitter or may be executed by a receiver. The method 200 is based on an FBMC modulation technology. The method 200 may include the following steps:

210. Select at least two groups of data from a to-be-processed data stream according to a preset first interval in a staggered manner.

220. Perform Fourier transform on each of the at least two groups of data to obtain at least two groups of first data.

230. Perform frequency domain filtering on the at least two groups of first data by using a prototype filter, to obtain at least two groups of second data.

240. Perform inverse Fourier transform on each of the at least two groups of second data to obtain at least two groups of third data.

250. Add the at least two groups of third data according to a preset second interval in a staggered manner.

In this embodiment of the present invention, multiple groups of data are selected from a data stream in a staggered manner. Signal processing is performed on the multiple groups of data in a frequency domain by using a prototype filter, and complexity of the processing process is relatively low. In the process of performing signal processing on the multiple groups of data, an invertible feature of discrete Fourier transform and inverse discrete Fourier transform is used, so that data obtained after transform reserves a feature of a single carrier, and has a relatively low peak-to-average ratio.

It should be understood that the to-be-processed data stream in this embodiment of the present invention may be a symbol on which OFDM modulation has been performed, may be a symbol on which QAM modulation has been performed, or may be any other digital information. This embodiment of the present invention is not limited thereto. The to-be-processed carrier data stream may include sampling data. One symbol may include multiple pieces of sampling data.

For a transmitter, the to-be-processed data stream may be a to-be-sent data stream. For a receiver, the to-be-processed data stream may be a received data stream.

Fourier transform in this embodiment of the present invention may be discrete Fourier transform (DFT), and inverse Fourier transform may be inverse discrete Fourier transform (IDFT). DFT may include fast Fourier transform (FFT), and IDFT may include inverse fast Fourier transform (IFFT).

Optionally, the preset first interval is an interval between two groups of data selected in a staggered manner. For example, the preset first interval may be N/2, or may be M/2, N is a quantity of effective frequency domain subchannels, and M is a total quantity of frequency domain subchannels. Generally, only some of the M subchannels are effective, that is, M>N.

It should be further understood that in this embodiment of the present invention, at least two groups of data are selected in a staggered manner, and each group of data may include multiple pieces of sampling data. Optionally, in another embodiment, $K_1 \times N$ pieces of sampling data may be selected, or $K_2 \times M$ pieces of sampling data may be selected.

Specifically, the process of selecting at least two groups of data from the to-be-processed data stream according to the preset first interval in a staggered manner may be as follows.

For ease of description, data in the data stream are numbered. If a data is selected from data at a location point 0, $K_1 \times N$ pieces of data are selected. If a data is selected again from data at a location point N/2, $K_1 \times N$ pieces of data are selected, and so on. In this way, it is ensured that numbers of any two groups of data that are consecutively selected differ by the preset first interval. Specifically, the process of selecting data in a staggered manner may be shown in FIG. 3. To avoid repetition, details are not described herein again.

The process of adding the at least two groups of third data according to the preset second interval in a staggered manner may be as follows.

Data obtained after $n^{th}$ inverse discrete Fourier transform and data obtained after $(n-1)^{th}$ inverse discrete Fourier transform are added according to the preset second interval in a staggered manner. The data obtained after the $n^{th}$ inverse Fourier transform and the data obtained after the $(n-1)^{th}$ inverse Fourier transform differ by the preset second interval. Data obtained after n times of inverse Fourier transform is n groups of third data. Optionally, the preset second interval may be N/2, or may be M/2. Specifically, the staggered addition process may be shown in FIG. 4. To avoid repetition, details are not described herein again.

This embodiment of the present invention may be executed by a transmitter, or may be executed by a receiver.

Optionally, in another embodiment, a system to which the method is applied may include a first prototype filter and a second prototype filter. The preset first interval may be N/2, the preset second interval may be M/2, a quantity of each of the at least two groups of data may be $K_1 \times N$, and a quantity of each of the at least two groups of second data may be $K_2 \times M$. $K_1$ is an overlapping factor of the first prototype filter, $K_2$ is an overlapping factor of the second prototype filter, N is a quantity of effective frequency domain subchannels, M is a total quantity of frequency domain subchannels, M>0, and N>0.

Specifically, the transmitter may sequentially select $K_1 \times N$ pieces of data from the to-be-processed data stream according to an N/2 interval in a staggered manner; perform Fourier transform on the selected $K_1 \times N$ pieces of data; perform frequency domain filtering on $K_1 \times N$ pieces of data obtained after Fourier transform; perform inverse Fourier transform on data obtained after frequency domain filtering; and add, according to an M/2 interval in a staggered manner, data obtained after inverse Fourier transform.

Optionally, in another embodiment, a system to which the method is applied may include a first prototype filter and a second prototype filter. The preset first interval may be M/2, the preset second interval may be N/2, a quantity of each of the at least two groups of data may be $K_2 \times M$, and a quantity of each of the at least two groups of second data may be $K_1 \times N$. $K_1$ is an overlapping factor of the first prototype filter, $K_2$ is an overlapping factor of the second prototype filter, N is a quantity of effective frequency domain subchannels, M is a total quantity of frequency domain subchannels, M>0, and N>0.

Specifically, the receiver may sequentially select $K_2 \times M$ pieces of data from the data stream according to an M/2 interval in a staggered manner; perform Fourier transform on the selected $K_2 \times M$ pieces of data; perform frequency domain filtering on $K_2 \times M$ pieces of data obtained after Fourier transform; perform inverse Fourier transform on data obtained after frequency domain filtering; and add, according to an N/2 interval in a staggered manner, data obtained after inverse Fourier transform.

Respective descriptions about the transmitter and the receiver are separately given below. First, the method executed by the transmitter is described.

Optionally, in another embodiment, the prototype filter may include a first prototype filter and a second prototype filter. In process 230, the transmitter may perform frequency domain prefiltering on the at least two groups of first data according to a frequency domain response of the first prototype filter, to obtain at least two groups of prefiltered data; perform subcarrier mapping on the at least two groups of prefiltered data to obtain at least two groups of mapped data; and perform frequency domain post-filtering on the at least two groups of mapped data according to a frequency domain response of the second prototype filter, to obtain the at least two groups of second data.

A function of frequency domain prefiltering is to perform, according to a granularity of a subchannel interval, a frequency domain filtering operation on a signal obtained after Fourier transform.

Optionally, in another embodiment, in a frequency domain prefiltering process, the transmitter may perform conjugation on a first frequency domain response of the first prototype filter to obtain a first vector, or use a first frequency domain response of the first prototype filter as a first vector; perform circular left shifting on the first vector for at least once to obtain a second vector; and perform vector multiplication on the at least two groups of first data and the second vector to obtain the at least two groups of prefiltered data.

It should be understood that optionally, in another embodiment, when the frequency domain response is a pure real number or is approximately a pure real number, in this embodiment of the present invention, a conjugation operation may not be performed in the prefiltering process, that is, the first vector is made equal to the first frequency domain response. Being approximately a pure real number means that an imaginary part of the frequency domain response is less than a threshold.

Specifically, the frequency domain prefiltering process may be as follows.

Specifically, an N×K$_1$N matrix G$_1$ may be first generated, and K$_1$N is K$_1$×N. A method for generating G$_1$ may be as follows:

It is assumed that the frequency domain response of the first prototype filter is a row vector g and has a length of K$_1$N, and a value of the frequency domain response is equal to a result of discrete Fourier transform of a time domain surge response of the first prototype filter; conjugation is performed on g to obtain h, h is shifted leftward by K$_1$ positions to obtain h$_1$, and then h$_1$ is shifted leftward by K$_1$ positions to obtain h$_2$. By analogy, this operation is repeated for N−1 times to obtain h$_{N-1}$. The N×K$_1$N matrix G$_1$ may include h, h$_1$, h$_2$, . . . , h$_{N-1}$.

$$G_1 = \begin{pmatrix} h \\ h_1 \\ \vdots \\ h_{N-1} \end{pmatrix}$$

It should be understood that optionally, in another embodiment, when the frequency domain response is a pure real number or is approximately a pure real number, in this embodiment of the present invention, a conjugation operation may not be performed in the prefiltering process, that is, the first vector is made equal to the first frequency domain response. Being approximately a pure real number means that an imaginary part of the frequency domain response is less than a threshold.

G$_1$ is multiplied by K$_1$×N pieces of data obtained after discrete Fourier transform, to obtain N pieces of data obtained after frequency domain prefiltering. The process is as follows:

$$X_1 = G_1 S,$$

where

S is the K$_1$×N pieces of data obtained after discrete Fourier transform, S is a column vector whose length is K$_1$N, and X$_1$ is the N pieces of data obtained after frequency domain prefiltering and is actually a column vector whose length is N.

It should be understood that the frequency domain response g of the prototype filter has a relatively high amplitude at a central location, and has gradually decreasing amplitudes on two sides. To reduce calculation complexity, in this embodiment of the present invention, the frequency domain response g may be shortened to remove parts having relatively small amplitudes on the two sides. Therefore, when the frequency domain response g is multiplied by K$_1$×N pieces of data obtained after Fourier transform, only a nonzero element in g participates in the operation. Optionally, in another embodiment, a filter having a relatively short frequency domain response length may be implemented by using some existing methods for designing a filter. For example, the prototype filter may be designed by using a frequency domain sampling method. A quantity of nonzero elements of a frequency domain response of the prototype filter may be equal to 2K$_1$−1. This greatly reduces filtering complexity.

Similarly, by means of filter shortening or a special filter design method, there may also be a large quantity of elements in the matrix G$_1$ that are 0 or are approximately 0, that is, the matrix G$_1$ is a sparse matrix. In a calculation process, only a nonzero element can be allowed to participate in the operation, thereby reducing calculation complexity.

It should be noted that the foregoing matrix multiplication manner used to implement frequency domain prefiltering is merely one of mathematical representation methods, and there is another mathematical representation method that is used to complete the same operation. For example, K$_1$×N pieces of data obtained after Fourier transform may be multiplied by elements in rows in G$_1$ row by row, and products obtained by means of multiplication are accumulated, or a same result may be obtained. In addition, a sequence of the rows in the matrix G$_1$ is not unique, and may be changed. A specific implementation method of frequency domain prefiltering is not limited in the present invention, and all technical solutions that achieve a same effect as the foregoing frequency domain prefiltering process shall fall within the protection scope of the present invention.

Optionally, in another embodiment, two adjacent subcarriers to which the at least two groups of prefiltered data are mapped are spaced by K$_2$−1 empty subcarriers, and K$_2$ is an overlapping factor of the second prototype filter.

A subcarrier mapping process may be as follows.

Specifically, data obtained after frequency domain prefiltering is N pieces of data. The N pieces of data obtained after frequency domain prefiltering are mapped to corresponding subcarriers, and a length of mapped data is K$_2$×M. The mapping process may be as follows.

Subcarrier numbers corresponding to the N pieces of data obtained after frequency domain prefiltering are determined. It should be understood that in a multicarrier system, valid data is generally mapped to merely some subcarriers, and data of another user may be mapped to remaining subcarriers or remaining subcarriers may be used as guard subcarriers. Subcarrier numbers are numbers of the subcarriers corresponding to these pieces of valid data.

The N pieces of data obtained after frequency domain prefiltering are mapped to corresponding N subcarriers. Any two adjacent subcarriers in the N subcarriers are spaced by K$_2$−1 empty subcarriers, and data whose length is K$_2$×(N−1) is obtained. Data on the empty subcarriers is 0.

Optionally, in another embodiment, 0 is added to two sides of the data whose length is K$_2$×(N−1), so that a total length is K$_2$×M.

Optionally, in an embodiment, the process of determining the subcarrier numbers may be implemented by using a scheduling function, or may be implemented by using another existing method. The process of determining the subcarrier numbers is not limited in the present invention.

Optionally, in another embodiment, the N subcarrier numbers corresponding to the N pieces of data obtained after frequency domain prefiltering may be central locations of K$_2$×M subcarriers, that is, the N pieces of data are mapped to subcarriers in a spectrum center.

Optionally, in another embodiment, the N pieces of data obtained after frequency domain prefiltering may be mapped, according to a scheduling result, to subcarriers that are in K$_2$×M subcarriers and are suitable for data transmission.

It should be understood that on a subcarrier to which no data is mapped, if there is no other data for transmission, a value of the subcarrier is set to 0. If there is other data for transmission, subcarrier mapping may be performed according to the method in this embodiment of the present invention.

The foregoing mapping process may be represented by using a mathematical method. The mathematical representation method of the mapping process is described in detail below:

generating a matrix $G_2$; and performing matrix multiplication on $G_2$ and the N pieces of data obtained after frequency domain prefiltering.

Specifically, a method for generating the matrix $G_2$ may be:

generating a matrix whose dimension is $K_2M \times N$, where an $i^{th}$ column is a $K_2 \times M$ vector $b_i(i=0, 1, \ldots, N-1)$, it is assumed that a $j^{th}$ element of $b_i$ is $b_{j,i}(j=0, 1, \ldots, K_2M-1)$, and $$b_{j,i} = \begin{cases} 1 & j = P_i \\ 0 & j \in \{0 \ K_2M - 1], j \neq P_i \end{cases},$$

where $P_i$ represents that an $i^{th}$ piece of data in the N pieces of data obtained after frequency domain prefiltering is mapped to a subcarrier whose number is $P_i$; and optionally, it may be assumed that $P_{i+1}-P_i=K_2-1$, so as to achieve an effect that two adjacent subcarriers to which prefiltered data is mapped are spaced by $K_2-1$ empty subcarriers; and then performing matrix multiplication on $G_2$ and the N pieces of data obtained after frequency domain prefiltering, to obtain data obtained after subcarrier mapping, that is:

$$X_2 = G_2 X_1,$$

where $X_1$ is the N pieces of data obtained after frequency domain prefiltering, that is, a column vector whose length is N; and $X_2$ is the data obtained after subcarrier mapping, that is, data whose length is $K_2M$.

Similarly, by means of filter shortening or a special filter design method, there may also be a larger quantity of elements in the matrix $G_2$ that are 0 or are approximately 0, that is, the matrix $G_2$ is a sparse matrix. In a calculation process, only a nonzero element can be allowed to participate in the operation, thereby reducing calculation complexity.

Optionally, in another embodiment, in a frequency domain post-filtering process, the transmitter may perform circular left shifting on a second frequency domain response of the second prototype filter for at least once to obtain a third vector, and perform matrix multiplication on the at least two groups of mapped data and at least one third vector to obtain the at least two groups of second data.

Specifically, the frequency domain post-filtering process may be as follows.

The data obtained after subcarrier mapping may be data whose length is $K_2M$. The frequency domain post-filtering process may be described by using a matrix multiplication method that is specifically:

generating a matrix $G_3$; and performing matrix multiplication on $G_3$ and the data obtained after subcarrier mapping.

Specifically, a method for generating the matrix $G_3$ may be as follows:

It is assumed that the frequency domain response of the second prototype filter is a row vector $\beta$ and has a length of $K_2M$, and a value of the frequency domain response is equal to a result of discrete Fourier transform of a time domain surge response of the second prototype filter; $\beta$ is shifted leftward by one position to obtain $\beta_1$, and then $\beta_1$ is shifted leftward by one position to obtain $\beta^2$. By analogy, this operation is repeated for $K_2M-1$ times to obtain $\beta_{K_2M-1}$. The $K_2M \times K_2M$ matrix $G_3$ may include $\beta, \beta_1, \beta_2, \ldots, \beta_{K_2M-1}$:

$$G_3 = \begin{pmatrix} \beta \\ \beta_1 \\ \vdots \\ \beta_{K_2M-1} \end{pmatrix}$$

$G_3$ is multiplied by the data obtained after subcarrier mapping, to obtain N pieces of data obtained after frequency domain prefiltering. The process is as follows:

$$X_3 = G_3 X_2,$$

where $X_2$ is the data obtained after subcarrier mapping, $X_2$ is data whose length is $K_2M$, and $X_3$ is data obtained after frequency domain post-filtering and is actually data whose length is $K_2M$.

Similarly, by means of filter shortening or a special filter design method, there may also be a large quantity of elements in the matrix $G_3$ that are 0 or are approximately 0, that is, the matrix $G_3$ is a sparse matrix. In a calculation process, only a nonzero element can be allowed to participate in the operation, thereby reducing calculation complexity.

It should be noted that the foregoing matrix multiplication manner used to implement frequency domain post-filtering is merely one of mathematical representation methods, and there is another mathematical representation method that is used to complete the same operation. For example, $K_2M$ pieces of data obtained after subcarrier mapping may be multiplied by elements in rows in $G_3$ row by row, and products obtained by means of multiplication are accumulated, or a same result may be obtained. In addition, a sequence of the rows in the matrix $G_3$ is not unique, and may be changed. A specific implementation method of frequency domain post-filtering is not limited in the present invention, and all technical solutions that achieve a same effect as the foregoing frequency domain post-filtering process shall fall within the protection scope of the present invention.

Optionally, in another embodiment, frequency domain prefiltering, subcarrier mapping, and frequency domain post-filtering may be completed by means of one time of matrix multiplication. The prototype filter includes a first prototype filter and a second prototype filter. The performing frequency domain filtering on the at least two groups of first data by using a prototype filter, to obtain at least two groups of second data includes: obtaining numbers of subcarriers that need to be mapped; and performing frequency domain filtering on the at least two groups of first data according to the first prototype filter, the second prototype filter, and the numbers of the subcarriers, to obtain the at least two groups of second data.

A specific process may be:

generating a $K_2M \times K_2N$ matrix G, where $G=G_3*G_2 G_1$; and performing matrix multiplication on G and $K_1 \times N$ pieces of data obtained after Fourier transform, that is, $X_3=GS$.

Similarly, by means of filter shortening or a special filter design method, there may also be a large quantity of elements in the matrix G that are 0 or are approximately 0, that is, the matrix G is a sparse matrix. In a calculation process, only a nonzero element can be allowed to participate in the operation, thereby reducing calculation complexity.

Likewise, the foregoing matrix multiplication manner used to implement frequency domain filtering is merely one of mathematical representation methods, and there is another mathematical representation method that is used to complete the same operation. For example, $K_1 \times N$ pieces of data obtained after Fourier transform may be multiplied by elements in rows in G row by row, and products obtained by means of multiplication are accumulated, or a same result may be obtained. In addition, a sequence of the rows in the matrix G is not unique, and may be changed. A specific implementation method of frequency domain filtering is not limited in the present invention, all technical solutions that achieve a same effect as the foregoing frequency domain filtering process shall fall within the protection scope of the present invention.

It should be understood that overlapping factors of the first prototype filter and the second prototype filter may be the same or may be different. This embodiment of the present invention is not limited thereto.

The process in which the transmitter executes the method is described above. It should be understood that the method may also be executed by a receiver. A detailed description is given below for a case in which an executor is the receiver.

It should be understood that execution processes of the transmitter and the receiver are similar. The transmitter first uses the first prototype filter and then uses the second prototype filter. Correspondingly, the receiver first uses the second prototype filter and then uses the first prototype filter.

Optionally, in another embodiment, the receiver may perform frequency domain prefiltering on the at least two groups of first data according to the second prototype filter, to obtain at least two groups of prefiltered data; perform an equalization operation on the at least two groups of prefiltered data to obtain at least two groups of equalized data; oversample the at least two groups of equalized data to obtain at least two groups of oversampled data; and perform post-filtering on the at least two groups of oversampled data according to the first prototype filter, to obtain the at least two groups of second data.

Optionally, in another embodiment, in a process of oversampling the at least two groups of equalized data, the receiver may insert $K_1-1$ pieces of empty data between two pieces of adjacent data in any one of the at least two groups of equalized data, to obtain the at least two groups of oversampled data. $K_1$ is an overlapping factor of the first prototype filter.

Optionally, in an embodiment, a frequency domain prefiltering process may be:

performing, by using a matrix $G_3$ obtained after frequency domain prefiltering performed by the transmitter, frequency domain prefiltering on the $K_2 \times M$ pieces of data obtained after Fourier transform; and obtaining N pieces of valid data according to a subcarrier number used by the transmitter.

Optionally, in another embodiment, a frequency domain prefiltering process may be:

selecting corresponding row vectors from $G_3$ according to a subcarrier number used by the transmitter, and separately performing conjugation on the row vectors to form a new $N \times K_2 M$ matrix; and performing, by using the new $N \times K_2 M$ matrix, a filtering operation on the $K_2 \times M$ pieces of data obtained after Fourier transform, to obtain N pieces of data obtained after frequency domain prefiltering.

It should be understood that an equalization operation method is not limited in this embodiment of the present invention. For example, the equalization operation method may be a minimum mean square error (MMSE) equalization algorithm or a zero forcing (ZF) equalization algorithm.

A frequency domain post-filtering operation may be as follows:

It is assumed that a frequency domain response of the first prototype filter is a row vector g and has a length of KlN, and a value of the frequency domain response is equal to a result of discrete Fourier transform of a time domain surge response of the first prototype filter; g is shifted leftward by one position to obtain $g'_1$, and then $g'_1$ is shifted leftward by one position to obtain $g'_2$. By analogy, this operation is repeated for $K_1N-1$ times to obtain $g'_{K_1N-1}$. A $K_1N \times K_1N$ matrix $G'_1$ may include $G'_1$ may include g, $g'_1$, $g'_2$, ..., $h'_{K_1N-1}$:

$$G'_1 = \begin{pmatrix} g \\ g'_1 \\ \vdots \\ g'_{K_1N-1} \end{pmatrix}$$

$G'_1$ is multiplied by $K_1N$ pieces of data obtained after frequency domain oversampling, to obtain $K_1N$ pieces of data obtained after frequency domain post-filtering.

In this embodiment of the present invention, multiple groups of data are selected from a data stream in a staggered manner. Signal processing is performed on the multiple groups of data in a frequency domain by using a prototype filter, and complexity of the processing process is relatively low. In the process of performing signal processing on the multiple groups of data, an invertible feature of discrete Fourier transform and inverse discrete Fourier transform is used, so that data obtained after transform reserves a feature of a single carrier, and has a relatively low peak-to-average ratio.

Figure 3:
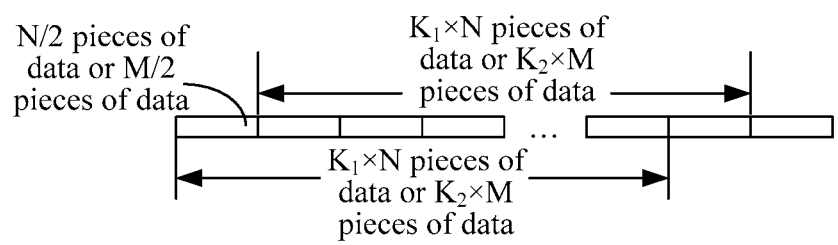
FIG. 3 is a schematic diagram of a process of selecting data in a staggered manner according to an embodiment of the present invention.

FIG. 3 is a schematic diagram of a process of selecting data in a staggered manner according to an embodiment of the present invention. The process of selecting data in a staggered manner shown in FIG. 3 may be executed by a transmitter or may be executed by a receiver.

The process of selecting data in a staggered manner is actually selecting data in a staggered manner at an interval each time. For ease of description, data in a data stream may be numbered. For example, data is selected from data at a location point of a number 0, and numbered location points at which data is selected each time are equally divided.

Specifically, if the process is executed by a transmitter, the transmitter may select multiple groups of data, and there may be a fixed interval between any two successive groups of data. For example, if $K_1N$ pieces of data are selected each time, that is, $K_1 \times N$ pieces of sampling data are selected, any two groups of KlN pieces of data are spaced by N/2 pieces of data. In other words, if $K_1N$ pieces of data are selected from the location point of the number 0 at the first time, $K_1N$ pieces of data are selected at a location point of a number N/2 at the second time, $K_1N$ pieces of data are selected at a location point of a number N at the third time, and so on.

Specifically, if the process is executed by a receiver, the receiver may select multiple groups of data, and there may be a fixed interval between any two successive groups of data. For example, if $K_2M$ pieces of data are selected each time, that is, $K_2 \times M$ pieces of sampling data are selected, any two groups of $K_2M$ pieces of data are spaced by M/2 pieces of data. In other words, if $K_2M$ pieces of data are selected from the location point of the number 0 at the first time, $K_2M$ pieces of data are selected at a location point of a number M/2 at the second time, $K_2M$ pieces of data are selected at a location point of a number M at the third time, and so on.

Figure 4:
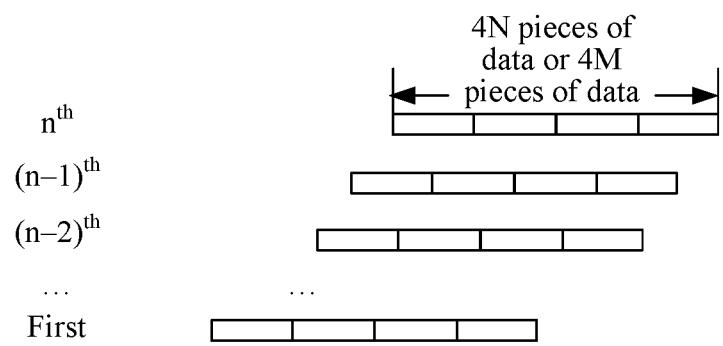
FIG. 4 is a schematic diagram of a staggered addition process according to an embodiment of the present invention.

FIG. 4 is a schematic diagram of a staggered addition process according to an embodiment of the present invention. The staggered addition process shown in FIG. 4 may be executed by a transmitter or may be executed by a receiver. A case in which $K_1=4$ or $K_2=4$ is shown in FIG. 4.

Two groups of data obtained after any two times of output are added in a staggered manner at an interval. If data is selected for n times and a group of data is selected each time, n groups of data are obtained. Data output by $n^{th}$ inverse Fourier transform and data output by $(n-1)^{th}$ inverse Fourier transform are added at a fixed interval. An interval between each two groups of data is the same.

Specifically, if the process is executed by a transmitter, the transmitter may add multiple groups of output data in a staggered manner. For example, as can be learned from the foregoing description, the transmitter may select $K_1N$ pieces of data each time, and then outputs $K_2M$ pieces of data after performing Fourier transform, frequency domain processing, and inverse Fourier transform. Two groups of $K_2M$ pieces of data that are output at any two times may be spaced by M/2 pieces of data.

Specifically, if the process is executed by a receiver, the receiver may add multiple groups of output data in a staggered manner. For example, as can be learned from the foregoing description that, the receiver may select $K_2M$ pieces of data each time, and then outputs $K_1N$ pieces of data after performing Fourier transform, frequency domain filtering, and inverse Fourier transform. Two groups of $K_1N$ pieces of data that are output at any two times may be spaced by N/2 pieces of data.

Figure 5:
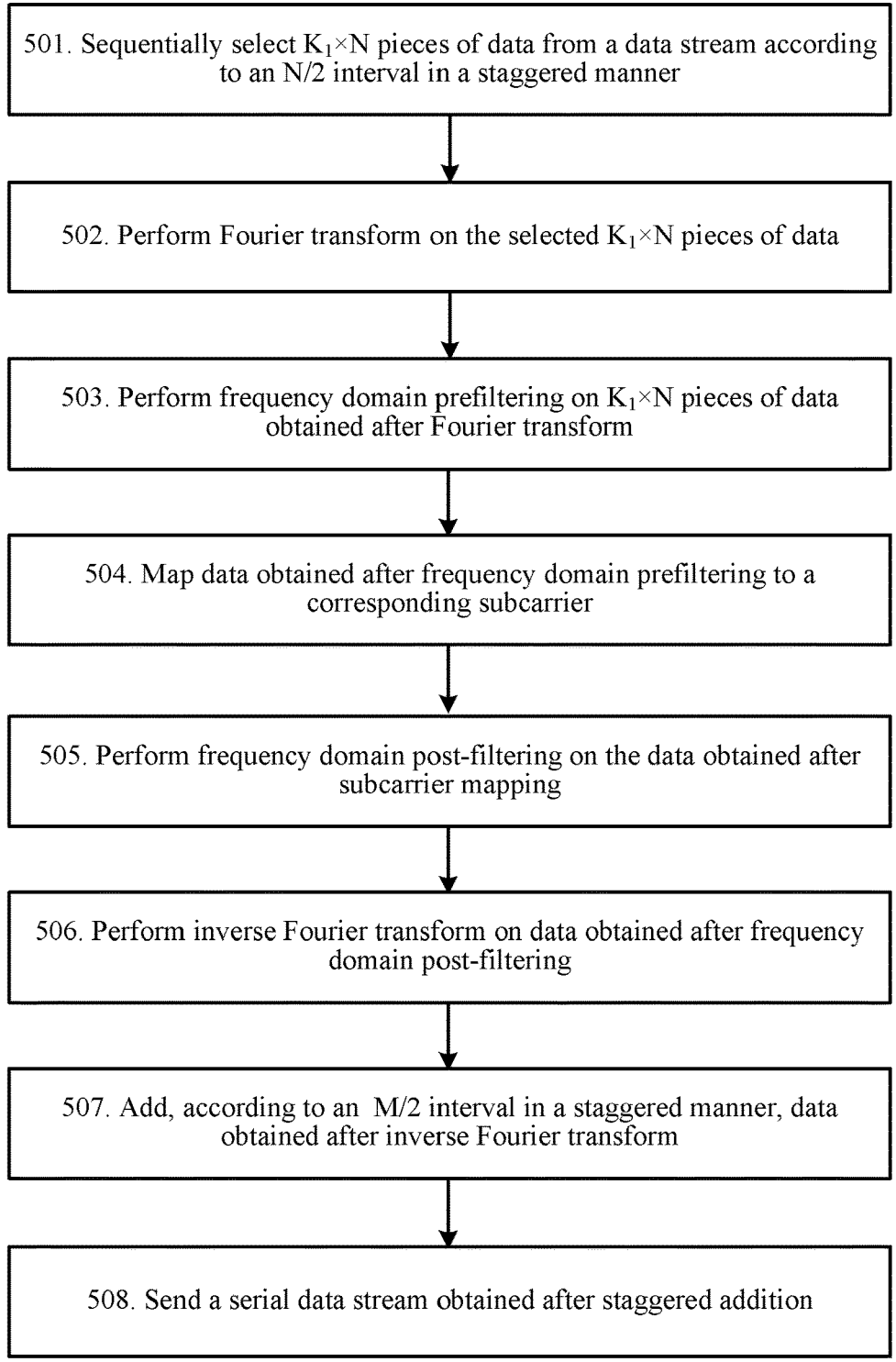
FIG. 5 is a schematic flowchart of a data processing process according to an embodiment of the present invention.

FIG. 5 is a schematic flowchart of a data processing process according to an embodiment of the present invention. The process shown in FIG. 5 may be executed by a transmitter. The transmitter may be located in a base station, or may be located in a terminal device. A process 500 is based on an FBMC technology. An overlapping factor of a first prototype filter is $K_1$, an overlapping factor of a second prototype filter is $K_2$, N is a quantity of effective frequency domain subchannels, M is a total quantity of frequency domain subchannels, M>0, and N>0. The process 500 includes the following steps.

501. Sequentially select $K_1 \times N$ pieces of data from a data stream according to an N/2 interval in a staggered manner.

Step 501 may be applicable to the process of selecting data in a staggered manner shown in FIG. 3. To avoid repetition, details are not described herein again. Specifically, if data in a data stream are numbered, and it is assumed that in step 501, a value is selected from data at a location point of a number 0, $K_1 \times N$ pieces of data are selected. Selecting a value in a staggered manner is specifically selecting $K_1 \times N$ pieces of data again from data at a location point of a number N/2, and so on.

502. Perform Fourier transform on the selected $K_1 \times N$ pieces of data.

It should be understood that multiple groups of $K_1 \times N$ pieces of data are selected in step 501, and Fourier transform may be performed on each group of $K_1 \times N$ pieces of data. For ease of description, one group of $K_1 \times N$ pieces of data is used as an example for description.

503. Perform frequency domain prefiltering on $K_1 \times N$ pieces of data obtained after Fourier transform.

A function of frequency domain prefiltering is to perform, according to a granularity of a subchannel interval, a frequency domain filtering operation on a signal obtained after Fourier transform.

Specifically, an $N \times K_1 N$ matrix $G_1$ may be first generated, and $K_1 N$ is $K_1 \times N$. A method for generating $G_1$ may be as follows:

It is assumed that a frequency domain response of a first prototype filter is a row vector g and has a length of $K_1 N$, and a value of the frequency domain response is equal to a result of discrete Fourier transform of a time domain surge response of the first prototype filter; conjugation is performed on g to obtain h, h is shifted leftward by $K_1$ positions to obtain $h_1$, and then $h_1$ is shifted leftward by $K_1$ positions to obtain $h_2$. By analogy, this operation is repeated for N−1 times to obtain $h_{N-1}$. The $N \times K_1 N$ matrix $G_1$ may include h, $h_1$, $h_2$, ..., $h_{N-1}$.

$$G_1 = \begin{pmatrix} h \\ h_1 \\ \vdots \\ h_{N-1} \end{pmatrix}$$

It should be understood that optionally, in another embodiment, when the frequency domain response is a pure real number or is approximately a pure real number, in this embodiment of the present invention, a conjugation operation may not be performed in the prefiltering process, that is, a first vector is made equal to a first frequency domain response. Being approximately a pure real number means that an imaginary part of the frequency domain response is less than a threshold.

$G_1$ is multiplied by the $K_1 \times N$ pieces of data obtained after Fourier transform, to obtain N pieces of data obtained after frequency domain prefiltering. The process is as follows:

$$X_1 = G_1 S,$$

where

S may be the $K_1 \times N$ pieces of data obtained after Fourier transform, S is a column vector whose length is $K_1 N$, and $X_1$ is the N pieces of data obtained after frequency domain prefiltering and is actually a column vector whose length is N.

It should be understood that the frequency domain response g of a prototype filter has a relatively high amplitude at a central location, and has a gradually decreasing amplitudes on two sides. To reduce calculation complexity, in this embodiment of the present invention, the frequency domain response g may be shortened to remove parts having relatively small amplitudes on the two sides. Therefore, when the frequency domain response g is multiplied by the $K_1 \times N$ pieces of data obtained after Fourier transform, only a nonzero element in g participates in the operation. Optionally, in another embodiment, a filter having a relatively short frequency domain response length may be implemented by using some existing methods for designing a filter. For example, the prototype filter may be designed by using a frequency domain sampling method. A quantity of nonzero elements of a frequency domain response of the prototype filter may be equal to $2K_1-1$. This greatly reduces filtering complexity.

504. Map data obtained after frequency domain prefiltering to a corresponding subcarrier.

Specifically, the data obtained after frequency domain prefiltering in step 503 is N pieces of data. The N pieces of data obtained after frequency domain prefiltering are mapped to corresponding subcarriers, and a length of mapped data is $K_2 \times M$. The mapping process may be as follows.

Subcarrier numbers corresponding to the N pieces of data obtained after frequency domain prefiltering are determined.

The N pieces of data obtained after frequency domain prefiltering are mapped to corresponding N subcarriers. Any two adjacent subcarriers in the N subcarriers are spaced by $K_2-1$ empty subcarriers, and data whose length is $K_2 \times (N-1)$ is obtained. Data on the empty subcarriers is 0. Optionally, in another embodiment, 0 is added to two sides of the data whose length is $K_2 \times (N-1)$, so that a total length is $K_2 \times M$.

Optionally, in an embodiment, the process of determining the subcarrier numbers may be implemented by using a scheduling function, or may be implemented by using another existing method. The process of determining the subcarrier numbers is not limited in the present invention.

Optionally, in another embodiment, the N subcarrier numbers corresponding to the N pieces of data obtained after frequency domain prefiltering may be $K_2 \times M$ central locations, that is, the N pieces of data are mapped to subcarriers in a spectrum center.

Optionally, in another embodiment, the N pieces of data obtained after frequency domain prefiltering may be mapped, according to a scheduling result, to subcarriers that are in $K_2 \times M$ subcarriers and are suitable for data transmission.

It should be understood that on a subcarrier to which no data is mapped, if there is no other data for transmission, a value of the subcarrier is set to 0. If there is other data for transmission, subcarrier mapping may be performed according to the method in this embodiment of the present invention.

The foregoing mapping process may be represented by using a mathematical method. The mathematical representation method of the mapping process is described in detail below:

generating a matrix $G_2$; and performing matrix multiplication on $G_2$ and the N pieces of data obtained after frequency domain prefiltering.

Specifically, a method for generating the matrix $G_2$ may be:

generating a matrix whose dimension is $K_2M \times N$, where an $i^{th}$ column is a $K_2 \times M$ vector $b_i (i=0, 1, \ldots, N-1)$, it is assumed that a $j^{th}$ element of $b_i$ is $b_{j,i} (j=0, 1, \ldots, K_2M-1)$, and $$b_{j,i} = \begin{cases} 1 & j = P_i \\ 0 & j \in \{0 \; K_2M - 1], j \neq P_i \end{cases},$$

where $P_i$ represents that an $i^{th}$ piece of data in the N pieces of data obtained after frequency domain prefiltering is mapped to a subcarrier whose number is $P_i$; and optionally, it may be assumed that $P_{i+1}-P_i=K_2-1$, so as to achieve an effect that two adjacent subcarriers to which prefiltered data is mapped are spaced by $K_2-1$ empty subcarriers; and then performing matrix multiplication on $G_2$ and the N pieces of data obtained after frequency domain prefiltering, to obtain data obtained after subcarrier mapping, that is:

$X_2 = G_2 X_1,$ where $X_1$ is the N pieces of data obtained after frequency domain prefiltering, that is, a column vector whose length is N; and $X_2$ is the data obtained after subcarrier mapping, that is, data whose length is $K_2M$.

505. Perform frequency domain post-filtering on the data obtained after subcarrier mapping.

Optionally, in an embodiment, as can be learned from step 504, the data obtained after subcarrier mapping may be data whose length is $K_2M$. The frequency domain post-filtering process may be described by using a matrix multiplication method that is specifically:

generating a matrix $G_3$; and performing matrix multiplication on $G_3$ and the data obtained after subcarrier mapping.

Specifically, a method for generating the matrix $G_3$ may be as follows:

It is assumed that a frequency domain response of a second prototype filter is a row vector $\beta$ and has a length of $K_2M$, and a value of the frequency domain response is equal to a result of discrete Fourier transform of a time domain surge response of the second prototype filter; $\beta$ is shifted leftward by one position to obtain $\beta_1$, and $\beta_1$ is shifted leftward by one position to obtain $\beta_2$. By analogy, this operation is repeated for $K_2M-1$ times to obtain $\beta_{K_2M-1}$. The $K_2M \times K_2M$ matrix $G_3$ may include $\beta, \beta_1, \beta_2, \ldots, \beta_{K_2M-1}$:

$$G_3 = \begin{pmatrix} \beta \\ \beta_1 \\ \vdots \\ \beta_{K_2M-1} \end{pmatrix}$$

$G_3$ is multiplied by the data obtained after subcarrier mapping, to obtain N pieces of data obtained after frequency domain prefiltering. The process is as follows:

$X_3 = G_3 X_2,$ where $X_2$ is the data obtained after subcarrier mapping, $X_2$ is data whose length is $K_2M$, and $X_3$ is data obtained after frequency domain post-filtering and is actually data whose length is $K_2M$.

Optionally, in another embodiment, steps 503, 504, and 505 may be completed by using one time of matrix multiplication. This may be specifically:

generating a $K_2M \times K_2N$ matrix G, where $G=G_3 * G_2 G_1$; and performing matrix multiplication on G and the $K_1 \times N$ pieces of data obtained after Fourier transform, that is, $X_3 = GS$.

It should be understood that overlapping factors of the first prototype filter and the second prototype filter may be the same or may be different. This embodiment of the present invention is not limited thereto.

506. Perform inverse Fourier transform on data obtained after frequency domain post-filtering.

As can be learned from step 505, a length of the data obtained after frequency domain post-filtering may be $K_2M$. That is, inverse Fourier transform is performed on the $K_2M$ pieces of data.

507. Add, according to an M/2 interval in a staggered manner, data obtained after inverse Fourier transform.

It should be understood that in step 501, multiple groups of $K_1N$ pieces of data are selected at multiple times. In this embodiment of the present invention, operations in step 502 to step 506 are performed on $K_1N$ pieces of data that are selected each time in step 501, to obtain corresponding multiple groups of data that are obtained after inverse Fourier transform and whose length is $K_2M$.

Step 507 may be applicable to the staggered addition process shown in FIG. 4. A case in which $K_2$ is 4 is shown in FIG. 4. $K_2M$ pieces of data obtained after $n^{th}$ inverse Fourier transform and $K_2M$ pieces of data obtained after $(n-1)^{th}$ inverse Fourier transform are added according to an M/2 interval in a staggered manner. All groups of $K_2M$ pieces of data obtained after inverse Fourier transform are sequentially added to obtain a serial data stream.

508. Send a serial data stream obtained after staggered addition.

In this embodiment of the present invention, multiple groups of data are selected from a data stream in a staggered manner. Signal processing is performed on the multiple groups of data in a frequency domain by using a prototype filter, and complexity of the processing process is relatively low. In the process of performing signal processing on the multiple groups of data, an invertible feature of discrete Fourier transform and inverse discrete Fourier transform is used, so that data obtained after transform reserves a feature of a single carrier, and has a relatively low peak-to-average ratio.

Figure 6:
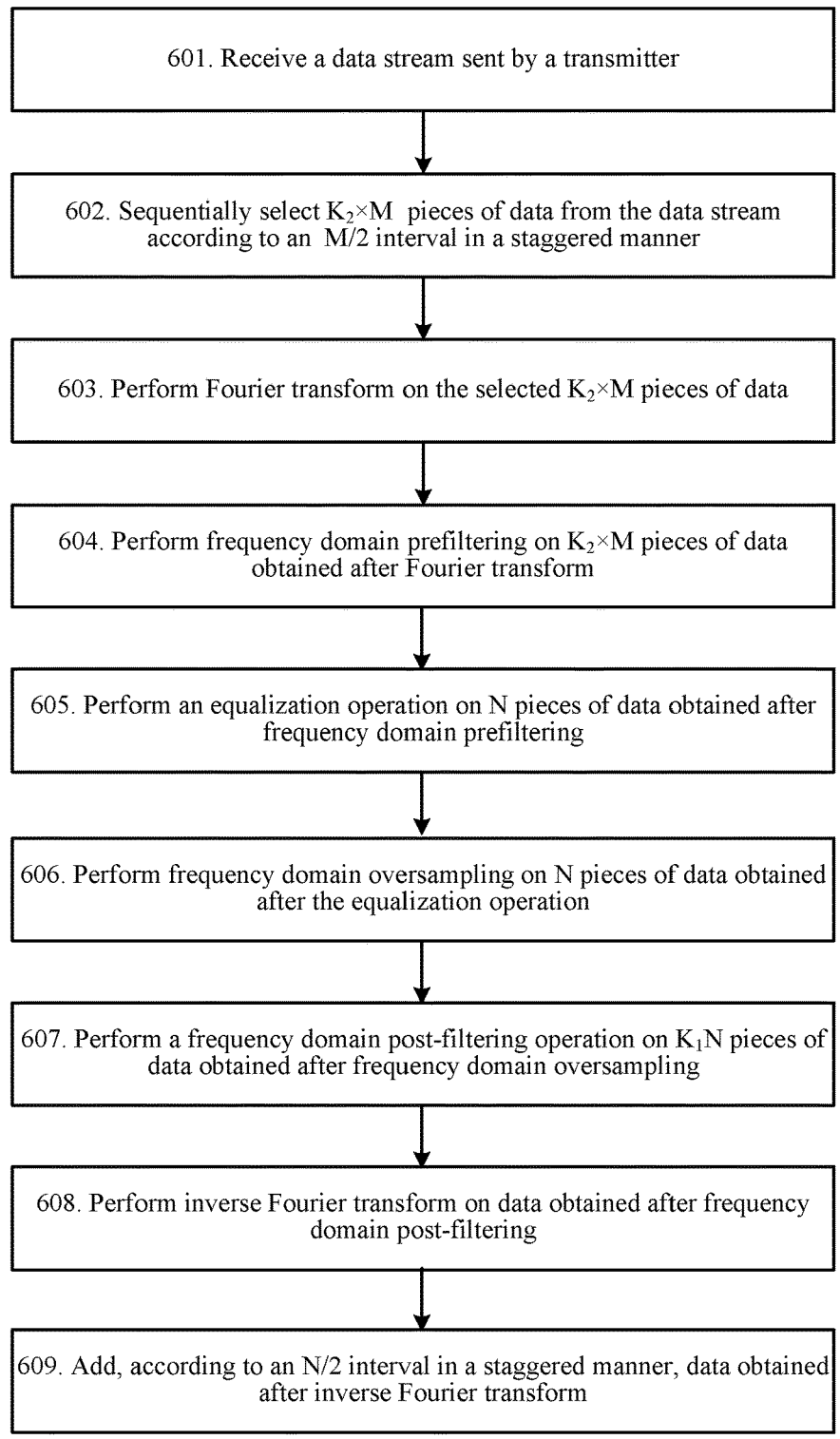
FIG. 6 is a schematic flowchart of a data processing process according to another embodiment of the present invention.

FIG. 6 is a schematic flowchart of a data processing process according to another embodiment of the present invention. The process shown in FIG. 6 may be executed by a receiver. The receiver may be located in a base station, or may be located in a terminal device. A process 600 is based on an FBMC technology. An overlapping factor of a first prototype filter is $K_1$, an overlapping factor of a second prototype filter is $K_2$, N is a quantity of effective frequency domain subchannels, M is a total quantity of frequency domain subchannels, M>0, and N>0. The process 600 includes the following steps.

601. Receive a data stream sent by a transmitter.

602. Sequentially select $K_2 \times M$ pieces of data from the data stream according to an M/2 interval in a staggered manner.

Step 602 may be applicable to the process of selecting data in a staggered manner shown in FIG. 3. To avoid repetition, details are not described herein again. Specifically, if data in the data stream are numbered, and it is assumed that a value is selected from data at a location point of a number 0, $K_2 \times M$ pieces of data are selected. Selecting a value in a staggered manner is specifically selecting $K_2 \times M$ pieces of data again from data at a location point of a number M/2, and so on.

603. Perform Fourier transform on the selected $K_2 \times M$ pieces of data.

It should be understood that multiple groups of $K_2 \times M$ pieces of data are selected in step 602, and Fourier transform may be performed on each group of $K_2 \times M$ pieces of data. For ease of description, one group of $K_2 \times M$ pieces of data is used as an example for description.

604. Perform frequency domain prefiltering on $K_2 \times M$ pieces of data obtained after Fourier transform.

Optionally, in an embodiment, a frequency domain prefiltering process may be:

performing, by using a matrix $G_3$ obtained after frequency domain prefiltering performed by the transmitter shown in FIG. 5, frequency domain prefiltering on the $K_2 \times M$ pieces of data obtained after Fourier transform; and obtaining N pieces of valid data according to a subcarrier number used by the transmitter.

Optionally, in another embodiment, a frequency domain prefiltering process may be:

selecting corresponding row vectors in $G_3$ according to a subcarrier number used by the transmitter shown in FIG. 5, and separately performing conjugation on the row vectors, to form a new $N \times K_2M$ matrix; and performing, by using the new $N \times K_2M$ matrix, a filtering operation on the $K_2 \times M$ pieces of data obtained after Fourier transform, to obtain N pieces of data obtained after frequency domain prefiltering.

605. Perform an equalization operation on N pieces of data obtained after frequency domain prefiltering.

It should be understood that an equalization operation method is not limited in this embodiment of the present invention. For example, the equalization operation method may be a minimum mean square error (MMSE) equalization algorithm or a zero forcing (ZF) equalization algorithm.

606. Perform frequency domain oversampling on N pieces of data obtained after the equalization operation.

Specifically, $K_1-1$ pieces of data 0 are inserted between any two adjacent pieces of sampling data in the N pieces of data obtained after the equalization operation, to obtain $K_1N$ pieces of data obtained after frequency domain oversampling.

607. Perform a frequency domain post-filtering operation on $K_1N$ pieces of data obtained after frequency domain oversampling.

The frequency domain post-filtering operation may be as follows:

It is assumed that a frequency domain response of a first prototype filter is a row vector g and has a length of $K_1N$, and a value of the frequency domain response is equal to a result of discrete Fourier transform of a time domain surge response of the first prototype filter; g is shifted leftward by one position to obtain $g'_1$, and then $g'_1$ is shifted leftward by one position to obtain $g'_2$. By analogy, this operation is repeated for $K_1N-1$ times to obtain $g'_{K_1N-1}$. A $K_1N \times K_1N$ matrix $G'_1$ may include g, $g'_1$, $g'_2$, ..., $g'_{K_1N-1}$.

$$G'_1 = \begin{pmatrix} g \\ g'_1 \\ \vdots \\ g'_{K_1N-1} \end{pmatrix}$$

$G'_1$ is multiplied by the $K_1N$ pieces of data obtained after frequency domain oversampling, to obtain $K_1N$ pieces of data obtained after frequency domain post-filtering.

608. Perform inverse Fourier transform on data obtained after frequency domain post-filtering.

As can be learned from step 607, a length of the data obtained after frequency domain post-filtering may be $K_1N$. That is, inverse Fourier transform is performed on the $K_1N$ pieces of data.

609. Add, according to an N/2 interval in a staggered manner, data obtained after inverse Fourier transform.

It should be understood that in step 602, multiple groups of $K_2M$ pieces of data are selected at multiple times. In this embodiment of the present invention, operations in step 603 to step 608 are performed on $K_2M$ pieces of data that are selected each time in step 602, to obtain corresponding multiple groups of data that are obtained after inverse Fourier transform and whose length is $K_1N$.

Step 609 may be applicable to the staggered addition process shown in FIG. 4. A case in which $K_1$ is 4 is shown in FIG. 4. $K_1N$ pieces of data obtained after $n^{th}$ inverse Fourier transform and $K_1N$ pieces of data obtained after $(n-1)^{th}$ inverse Fourier transform are added according to an N/2 interval in a staggered manner. All groups of K1N pieces of data obtained after inverse Fourier transform are sequentially added to obtain a serial data stream.

In this embodiment of the present invention, multiple groups of data are selected from a data stream in a staggered manner. Signal processing is performed on the multiple groups of data in a frequency domain by using a prototype filter, and complexity of the processing process is relatively low. In the process of performing signal processing on the multiple groups of data, an invertible feature of discrete Fourier transform and inverse discrete Fourier transform is used, so that data obtained after transform reserves a feature of a single carrier, and has a relatively low peak-to-average ratio.

Figure 7:
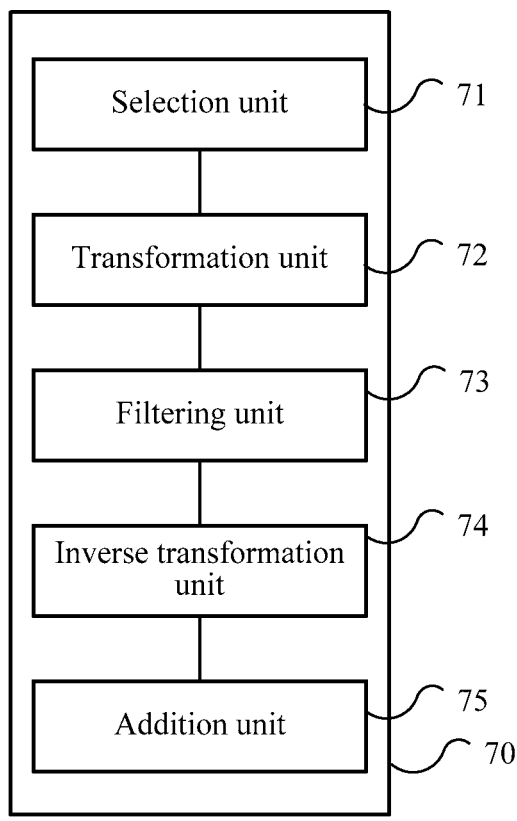
FIG. 7 is a schematic diagram of a data processing apparatus according to an embodiment of the present invention.

FIG. 7 is a schematic diagram of a data processing apparatus according to an embodiment of the present invention. The apparatus shown in FIG. 7 may implement the methods or the processes shown in FIG. 2 to FIG. 6. An apparatus 70 may include:

a selection unit 71, configured to select at least two groups of data from a to-be-processed data stream according to a preset first interval in a staggered manner;

a transformation unit 72, configured to perform Fourier transform on each of the at least two groups of data to obtain at least two groups of first data;

a filtering unit 73, configured to perform frequency domain filtering on the at least two groups of first data by using a prototype filter, to obtain at least two groups of second data;

an inverse transformation unit 74, configured to perform inverse Fourier transform on each of the at least two groups of second data to obtain at least two groups of third data; and an addition unit 75, configured to add the at least two groups of third data according to a preset second interval in a staggered manner.

In this embodiment of the present invention, multiple groups of data are selected from a data stream in a staggered manner. Signal processing is performed on the multiple groups of data in a frequency domain by using a prototype filter, and complexity of the processing process is relatively low. In the process of performing signal processing on the multiple groups of data, an invertible feature of discrete Fourier transform and inverse discrete Fourier transform is used, so that data obtained after transform reserves a feature of a single carrier, and has a relatively low peak-to-average ratio.

Optionally, the apparatus 70 may be a transmitter. Optional embodiments of the transmitter are described below.

Optionally, in another embodiment, the prototype filter includes a first prototype filter and a second prototype filter. The filtering unit 73 may obtain numbers of subcarriers that need to be mapped; and perform frequency domain filtering on the at least two groups of first data according to the first prototype filter, the second prototype filter, and the numbers of the subcarriers, to obtain the at least two groups of second data.

Optionally, in another embodiment, the prototype filter includes a first prototype filter and a second prototype filter. The filtering unit 73 may perform frequency domain prefiltering on the at least two groups of first data according to a frequency domain response of the first prototype filter, to obtain at least two groups of prefiltered data; perform subcarrier mapping on the at least two groups of prefiltered data to obtain at least two groups of mapped data; and perform frequency domain post-filtering on the at least two groups of mapped data according to a frequency domain response of the second prototype filter, to obtain the at least two groups of second data.

Optionally, in another embodiment, in a frequency domain prefiltering process, the transmitter may perform conjugation on a first frequency domain response of the first prototype filter to obtain a first vector, or use a first frequency domain response of the first prototype filter as a first vector; perform circular left shifting on the first vector for at least once to obtain a second vector; and perform vector multiplication on the at least two groups of first data and the second vector to obtain the at least two groups of prefiltered data.

Optionally, in another embodiment, in a frequency domain post-filtering process, the transmitter may perform circular left shifting on a second frequency domain response of the second prototype filter for at least once to obtain a third vector, and perform vector multiplication on the at least two groups of mapped data and the third vector to obtain the at least two groups of second data.

Optionally, in another embodiment, two adjacent subcarriers to which the at least two groups of prefiltered data are mapped may be spaced by $K_2-1$ empty subcarriers, and $K_2$ is an overlapping factor of the second prototype filter.

Optionally, in another embodiment, the preset first interval may be N/2, the preset second interval may be M/2, a quantity of each of the at least two groups of data may be $K_1 \times N$, and a quantity of each of the at least two groups of second data may be $K_2 \times M$. $K_1$ is an overlapping factor of the first prototype filter. $K_2$ is the overlapping factor of the second prototype filter, N is a quantity of effective frequency domain subchannels, M is a total quantity of frequency domain subchannels, M>0, and N>0.

Optionally, the apparatus 70 may be a receiver. Optional embodiments of the receiver are described below.

Optionally, in another embodiment, the prototype filter includes a first prototype filter and a second prototype filter. The filtering unit 73 may perform frequency domain prefiltering on the at least two groups of first data according to the second prototype filter, to obtain at least two groups of prefiltered data; perform an equalization operation on the at least two groups of prefiltered data to obtain at least two groups of equalized data; oversample the at least two groups of equalized data to obtain at least two groups of oversampled data; and perform post-filtering on the at least two groups of oversampled data according to the first prototype filter, to obtain the at least two groups of second data.

Optionally, in another embodiment, the filtering unit 73 may insert $K_1-1$ pieces of empty data between two pieces of adjacent data in any one of the at least two groups of equalized data, to obtain the at least two groups of oversampled data. $K_1$ is an overlapping factor of the first prototype filter.

Optionally, in another embodiment, the preset first interval may be M/2, the preset second interval may be N/2, a quantity of each of the at least two groups of data may be $K_2 \times M$, and a quantity of each of the at least two groups of second data may be $K_1 \times N$. $K_1$ is the overlapping factor of the first prototype filter, $K_2$ is the overlapping factor of the second prototype filter, N is a quantity of effective frequency domain subchannels, M is a total quantity of frequency domain subchannels, M>0, and N>0.

Figure 8:
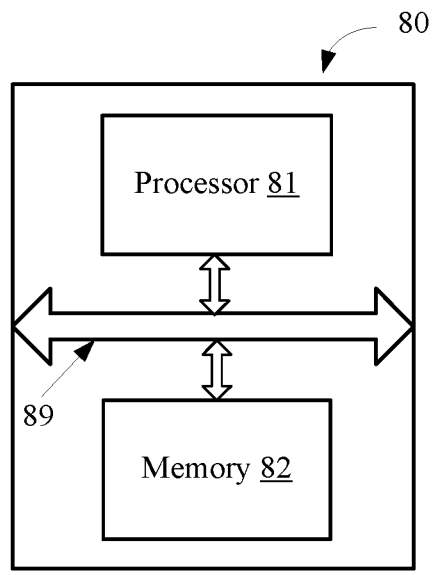
FIG. 8 is a schematic diagram of a data processing apparatus according to another embodiment of the present invention.

FIG. 8 is a schematic diagram of a data processing apparatus according to another embodiment of the present invention. An apparatus 80 in FIG. 8 may be configured to implement the steps and the methods in the foregoing method embodiments. The apparatus in FIG. 8 includes a processor 81 and a memory 82. The processor 81 is connected to the memory 82 by using a bus system 89.

The processor 81 controls an operation of the apparatus 80. The memory 82 may include a read-only memory and a random access memory, and provide an instruction and data to the processor 81. A part of the memory 82 may further include a non-volatile random access memory (NVRAM). Components of the apparatus 80 are coupled together by using the bus system 89. In addition to a data bus, the bus system 89 further includes a power supply bus, a control bus, and a status signal bus. However, for clear description, various types of buses in the figure are marked as the bus system 89.

The processor 81 may be an integrated circuit chip and have a signal processing capability. The processor 81 may be a general purpose processor, a digital signal processor (DSP), an application-specific integrated circuit (ASIC), a field programmable gate array (FPGA) or another programmable logic device, a discrete gate or a transistor logic device, or a discrete hardware component, and may implement or execute methods, steps, and logical block diagrams disclosed in the embodiments of the present invention. The general purpose processor may be a microprocessor, or the processor may be any conventional processor or the like. The processor 81 reads information in the memory 82, and controls various components of the apparatus 80 in combination with hardware of the processor 81.

The method in FIG. 2 may be implemented in the apparatus 80 in FIG. 8. To avoid repetition, details are not described again.

Specifically, under the control of the processor 81, the apparatus 80 completes the following operations:

selecting at least two groups of data from a to-be-processed data stream according to a preset first interval in a staggered manner;

performing Fourier transform on each of the at least two groups of data to obtain at least two groups of first data;

performing frequency domain filtering on the at least two groups of first data by using a prototype filter, to obtain at least two groups of second data;

performing inverse Fourier transform on each of the at least two groups of second data to obtain at least two groups of third data; and adding the at least two groups of third data according to a preset second interval in a staggered manner.

In this embodiment of the present invention, multiple groups of data are selected from a data stream in a staggered manner. Signal processing is performed on the multiple groups of data in a frequency domain by using a prototype filter, and complexity of the processing process is relatively low. In the process of performing signal processing on the multiple groups of data, an invertible feature of discrete Fourier transform and inverse discrete Fourier transform is used, so that data obtained after transform reserves a feature of a single carrier, and has a relatively low peak-to-average ratio.

Optionally, in another embodiment, the prototype filter includes a first prototype filter and a second prototype filter. The processor 81 may obtain numbers of subcarriers that need to be mapped; and perform frequency domain filtering on the at least two groups of first data according to the first prototype filter, the second prototype filter, and the numbers of the subcarriers, to obtain the at least two groups of second data.

Optionally, in another embodiment, the prototype filter includes a first prototype filter and a second prototype filter. The processor 81 may perform frequency domain prefiltering on the at least two groups of first data according to a frequency domain response of the first prototype filter, to obtain at least two groups of prefiltered data; perform subcarrier mapping on the at least two groups of prefiltered data to obtain at least two groups of mapped data; and perform frequency domain post-filtering on the at least two groups of mapped data according to a frequency domain response of the second prototype filter, to obtain the at least two groups of second data.

Optionally, in another embodiment, in a frequency domain prefiltering process, the processor 81 may perform conjugation on a first frequency domain response of the first prototype filter to obtain a first vector, or use a first frequency domain response of the first prototype filter as a first vector; perform circular left shifting on the first vector for at least once to obtain a second vector; and perform vector multiplication on the at least two groups of first data and the second vector to obtain the at least two groups of prefiltered data.

Optionally, in another embodiment, in a frequency domain post-filtering process, the processor 81 may perform circular left shifting on a second frequency domain response of the second prototype filter for at least once to obtain a third vector, and multiply the at least two groups of mapped data and the third vector to obtain the at least two groups of second data.

Optionally, in another embodiment, two adjacent subcarriers to which the at least two groups of prefiltered data are mapped are spaced by $K_2-1$ empty subcarriers, and $K_2$ is an overlapping factor of the second prototype filter.

Optionally, in another embodiment, the preset first interval is $N/2$, the preset second interval is $M/2$, a quantity of each of the at least two groups of data is $K_1 \times N$, and a quantity of each of the at least two groups of second data is $K_2 \times M$. $K_1$ is an overlapping factor of the first prototype filter, $K_2$ is the overlapping factor of the second prototype filter, N is a quantity of effective frequency domain subchannels, M is a total quantity of frequency domain subchannels, $M>0$, and $N>0$.

Optionally, in another embodiment, the prototype filter includes a first prototype filter and a second prototype filter. The processor 81 may perform frequency domain prefiltering on the at least two groups of first data according to the second prototype filter, to obtain at least two groups of prefiltered data; perform an equalization operation on the at least two groups of prefiltered data to obtain at least two groups of equalized data; oversample the at least two groups of equalized data to obtain at least two groups of oversampled data; and perform post-filtering on the at least two groups of oversampled data according to the first prototype filter, to obtain the at least two groups of second data.

Optionally, in another embodiment, the processor 81 may insert $K_1-1$ pieces of empty data between two pieces of adjacent data in any one of the at least two groups of equalized data, to obtain the at least two groups of oversampled data. $K_1$ is an overlapping factor of the first prototype filter.

Optionally, in another embodiment, the preset first interval is $M/2$, the preset second interval is $N/2$, a quantity of each of the at least two groups of data is $K_2 \times M$, and a quantity of each of the at least two groups of second data is $K_1 \times N$. $K_1$ is the overlapping factor of the first prototype filter, $K_2$ is an overlapping factor of the second prototype filter, N is a quantity of effective frequency domain subchannels, M is a total quantity of frequency domain subchannels, $M>0$, and $N>0$.

It should be understood that "one embodiment" or "an embodiment" mentioned in the whole specification means that particular characteristics, structures, or features related to the embodiment are included in at least one embodiment of the present invention. Therefore, "in one embodiment" or "in an embodiment" appearing throughout the specification is unnecessarily a same embodiment. In addition, these particular characteristics, structures, or features can be combined in one or more embodiments in any appropriate manner. Sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining B according to A does not mean that B is determined according to A only, that is, B may also be determined according to A and/or other information.

A person of ordinary skill in the art may be aware that, units and algorithm steps in the examples described with reference to the embodiments disclosed in this specification can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is only an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or the communication connections between the apparatuses or units may be electrical, mechanical, or other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can be used to carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray or radio and microwave, the coaxial cable, the optical fiber/cable, the twisted pair, the DSL or the wireless technologies such as the infrared ray or the radio and microwave are included in a definition of a medium to which they belong. For example, a disk and a disc used by the present invention include a compact disc (CD), a laser disc, an optical disc, a digital versatile disc (DVD), a floppy disk, and a Blu-ray disc. The disk generally copies data by a magnetic means, and the disc copies data optically by a laser means. The foregoing combination should also be included in the protection scope of the computer-readable medium.

In conclusion, what is described above is merely examples of embodiments of the technical solutions of the present invention, but is not intended to limit the protection scope of the present invention. Any modification, equivalent replacement, or improvement made without departing from the principle of the present invention shall fall within the protection scope of the present invention.

The invention claimed is:

1. A data processing method, comprising:
   selecting at least two groups of data from a to-be-processed data stream according to a preset first interval in a staggered manner;
   performing Fourier transform on each of the at least two groups of data to obtain at least two groups of first data;
   performing frequency domain filtering on the at least two groups of first data to obtain at least two groups of second data by using a prototype filter comprising a first prototype filter and a second prototype filter, including:
  performing frequency domain prefiltering on the at least two groups of first data according to a frequency domain response of the first prototype filter, to obtain at least two groups of prefiltered data;
  performing subcarrier mapping on the at least two groups of prefiltered data to obtain at least two groups of mapped data; and
  performing frequency domain post-filtering on the at least two groups of mapped data according to a frequency domain response of the second prototype filter, to obtain the at least two groups of second data;
performing inverse Fourier transform on each of the at least two groups of second data to obtain at least two groups of third data; and
adding the at least two groups of third data according to a preset second interval in a staggered manner.

2. The method according to claim 1, wherein the performing the frequency domain prefiltering on the at least two groups of first data according to the frequency domain response of the first prototype filter comprises:
  performing conjugation on a first frequency domain response of the first prototype filter to obtain a first vector, or using the first frequency domain response of the first prototype filter as the first vector;
  performing circular left shifting on the first vector for at least once to obtain a second vector; and
  performing vector multiplication on the at least two groups of first data and the second vector to obtain the at least two groups of prefiltered data.

3. The method according to claim 1, wherein the performing the frequency domain post-filtering on the at least two groups of mapped data according to the frequency domain response of the second prototype filter comprises:
  performing circular left shifting on a second frequency domain response of the second prototype filter for at least once to obtain a third vector; and
  performing vector multiplication on the at least two groups of mapped data and the third vector to obtain the at least two groups of second data.

4. The method according to claim 1, wherein two adjacent subcarriers to which the at least two groups of prefiltered data are mapped are spaced by $K_2-1$ empty subcarriers, wherein $K_2$ is an overlapping factor of the second prototype filter.

5. The method according to claim 1, wherein the preset first interval is N/2, the preset second interval is M/2, a quantity of each of the at least two groups of data is $K_1 \times N$, and a quantity of each of the at least two groups of second data is $K_2 \times M$, wherein $K_1$ is an overlapping factor of the first prototype filter, $K_2$ is the overlapping factor of the second prototype filter, N is a quantity of effective frequency domain subchannels, M is a total quantity of frequency domain subchannels, M>0, and N>0.

6. A data processing method, comprising:
selecting at least two groups of data from a to-be-processed data stream according to a preset first interval in a staggered manner;
performing Fourier transform on each of the at least two groups of data to obtain at least two groups of first data;
performing frequency domain filtering on the at least two groups of first data to obtain at least two groups of second data by using a prototype filter comprising a first prototype filter and a second prototype filter, including:
  performing frequency domain prefiltering on the at least two groups of first data according to the second prototype filter, to obtain at least two groups of prefiltered data;
  performing an equalization operation on the at least two groups of prefiltered data to obtain at least two groups of equalized data;
  oversampling the at least two groups of equalized data to obtain at least two groups of oversampled data; and
  performing post-filtering on the at least two groups of oversampled data according to the first prototype filter, to obtain the at least two groups of second data;
performing inverse Fourier transform on each of the at least two groups of second data to obtain at least two groups of third data; and
adding the at least two groups of third data according to a preset second interval in a staggered manner.

7. The method according to claim 6, wherein the oversampling the at least two groups of equalized data to obtain the at least two groups of oversampled data comprises:
  inserting $K_1-1$ pieces of empty data between two pieces of adjacent data in any one of the at least two groups of equalized data, to obtain the at least two groups of oversampled data, wherein $K_1$ is an overlapping factor of the first prototype filter.

8. The method according to claim 6, wherein the preset first interval is M/2, the preset second interval is N/2, a quantity of each of the at least two groups of data is $K_2 \times M$, and a quantity of each of the at least two groups of second data is $K_1 \times N$, wherein $K_1$ is the overlapping factor of the first prototype filter, $K_2$ is an overlapping factor of the second prototype filter, N is a quantity of effective frequency domain subchannels, M is a total quantity of frequency domain subchannels, M>0, and N>0.

9. A data processing apparatus, comprising:
a processor; and
a memory coupled to the processor, wherein the memory has processor-readable instructions stored thereon, which when executed causes the processor to implement operations including:
selecting at least two groups of data from a to-be-processed data stream according to a preset first interval in a staggered manner;
performing Fourier transform on each of the at least two groups of data to obtain at least two groups of first data;
performing frequency domain filtering on the at least two groups of first data to obtain at least two groups of second data by using a prototype filter comprising a first prototype filter and a second prototype filter, including:
  performing frequency domain prefiltering on the at least two groups of first data according to a frequency domain response of the first prototype filter, to obtain at least two groups of prefiltered data;
  performing subcarrier mapping on the at least two groups of prefiltered data to obtain at least two groups of mapped data; and
  performing frequency domain post-filtering on the at least two groups of mapped data according to a frequency domain response of the second prototype filter, to obtain the at least two groups of second data;
performing inverse Fourier transform on each of the at least two groups of second data to obtain at least two groups of third data; and
adding the at least two groups of third data according to a preset second interval in a staggered manner.

10. The apparatus according to claim 9, wherein the operations include:
- performing conjugation on a first frequency domain response of the first prototype filter to obtain a first vector, or use the first frequency domain response of the first prototype filter as the first vector;
- performing circular left shifting on the first vector for at least once to obtain a second vector; and
- performing vector multiplication on the at least two groups of first data and the second vector to obtain the at least two groups of prefiltered data.

11. The apparatus according to claim 9, wherein the operations include:
- performing circular left shifting on a second frequency domain response of the second prototype filter for at least once to obtain a third vector; and
- performing vector multiplication on the at least two groups of mapped data and the third vector to obtain the at least two groups of second data.

12. The apparatus according to claim 9, wherein two adjacent subcarriers to which the at least two groups of prefiltered data are mapped are spaced by $K_2-1$ empty subcarriers, wherein $K_2$ is an overlapping factor of the second prototype filter.

13. The apparatus according to claim 9, wherein the preset first interval is N/2, the preset second interval is M/2, a quantity of each of the at least two groups of data is $K_1 \times N$, and a quantity of each of the at least two groups of second data is $K_2 \times M$, wherein $K_1$ is an overlapping factor of the first prototype filter, $K_2$ is the overlapping factor of the second prototype filter, N is a quantity of effective frequency domain subchannels, M is a total quantity of frequency domain subchannels, M>0, and N>0.

14. A data processing apparatus, comprising:
- a processor; and
- a memory coupled to the processor, wherein the memory has processor-readable instructions stored thereon, which when executed causes the processor to implement operations including:
  - selecting at least two groups of data from a to-be-processed data stream according to a preset first interval in a staggered manner;
  - performing Fourier transform on each of the at least two groups of data to obtain at least two groups of first data;
  - performing frequency domain filtering on the at least two groups of first data to obtain at least two groups of second data by using a prototype filter comprising a first prototype filter and a second prototype filter, including:
    - performing frequency domain prefiltering on the at least two groups of first data according to the second prototype filter, to obtain at least two groups of prefiltered data;
    - performing an equalization operation on the at least two groups of prefiltered data to obtain at least two groups of equalized data;
    - oversampling the at least two groups of equalized data to obtain the at least two groups of oversampled data; and
    - performing post-filtering on the at least two groups of oversampled data according to the first prototype filter, to obtain the at least two groups of second data,
  - performing inverse Fourier transform on each of the at least two groups of second data to obtain at least two groups of third data; and
  - adding the at least two groups of third data according to a preset second interval in a staggered manner.

15. The apparatus according to claim 14, wherein the operations include:
- insert $K_1-1$ pieces of empty data between two pieces of adjacent data in any one of the at least two groups of equalized data, to obtain the at least two groups of oversampled data, wherein $K_1$ is an overlapping factor of the first prototype filter.

16. The apparatus according to claim 14, wherein the preset first interval is M/2, the preset second interval is N/2, a quantity of each of the at least two groups of data is $K_2 \times M$, and a quantity of each of the at least two groups of second data is $K_1 \times N$, wherein $K_1$ is the overlapping factor of the first prototype filter, $K_2$ is an overlapping factor of the second prototype filter, N is a quantity of effective frequency domain subchannels, M is a total quantity of frequency domain subchannels, M>0, and N>0.

* * * * *